United States Patent [19]

Murakami et al.

[11] 4,167,383
[45] Sep. 11, 1979

[54] MULTI-RING DIE

[75] Inventors: Kenkichi Murakami, Osaka; Yoshiharu Kikuzawa, Takarazuka, both of Japan

[73] Assignee: Kabushiki Kaisha Plastic Kogaku Kenkyusho, Osaka, Japan

[21] Appl. No.: 857,710

[22] Filed: Dec. 5, 1977

[30] Foreign Application Priority Data

Dec. 3, 1976 [JP] Japan .................................. 51/145913

[51] Int. Cl.² ............................................ B29D 23/04
[52] U.S. Cl. .................................. 425/462; 425/133.1
[58] Field of Search ...................... 425/462, 133.1, 190, 425/191, 192 R; 264/173

[56] References Cited

U.S. PATENT DOCUMENTS

| | | | |
|---|---|---|---|
| 3,649,143 | 3/1972 | Papesh et al. | 425/133.1 X |
| 3,694,292 | 9/1972 | Schippers et al. | 425/133.1 X |

OTHER PUBLICATIONS

West German Offenlegungsschrift 1953114 425/133.1 5-1971.

*Primary Examiner*—Mark Rosenbaum
*Attorney, Agent, or Firm*—Armstrong, Nikaido, Marmelstein & Kubovcik

[57] ABSTRACT

A multi-ring die for extruding tubes composed of a plurality of layers comprises a die portion which is composed of a core and at least two rings disposed one around another and defining die passages therebetween and a column-like portion which is equipped with at least two nozzles mounted fixedly on the outer periphery thereof and is formed with passages communicating with the nozzles for feeding resins plasticized at a plurality of plasticizing mechanism into the die passages; each passage in the column-like portion comprising a guide passage and a branch passage having a plurality of branch bores disposed radially. The die of the invention is compact in size and is available even in the apparatus which is adopted for formation of tubes of a single layer. Besides the tube extruded from the die of the invention is even and uniform in thickness.

6 Claims, 3 Drawing Figures

MULTI-RING DIE

BACKGROUND OF THE INVENTION

The present invention relates to a novel multi-ring die for extruding tubes composed of a plurality of layers, and more particularly to a multi-ring die having a die portion which is composed of a core and a plurality of die rings lying one over another and a column-like portion formed with resin flow passages for feeding resins into the die portion.

Previous ordinary extrusion dies for the manufacture of tubes composed of a plurality of layers are provided with resin supplying passages which comprise an inmost passage for feeding a resin of inner layer disposed on the center line of the die, a second circular passage surrounding the inmost passage concentrically therewith for feeding a resin of a second layer and other circular passages lying one around another for feeding resins of respective layers. However, the die of this type has some deficiences.

Firstly, although the resin for the inmost layer can be supplyed through the center of the die, the layers other than the inmost layer are required to be supplying in directions radially to the center line of the die through the nozzle provided at a side thereof, striding over the passages internaly disposed. In the die of this type, the resin fed laterally diverges by means of a manifold and flows, encircling inside the manifold and thereafter turning its direction to the direction which is parallel to the axis of the die, into the inlet of the die passage through the narrow lands. In the case, the land which resist to the resin flow should be so designed that the land near the inlet of resin is made longer and on the contrary the land near far end of the manifold is shortened to compensate pressure depression due to resin flow through the manifold, so as to equalize the amount of resin flow per unit area around the die passage.

The structure of the manifold and the land is designed so that it is in conformity with a viscosity index of a plasticized resin, and on the other hand viscosity index thereof is variable depending upon the resin temperature and the shearing velocity during the process of formation. Therefore, in the ordinary die stated above having an inlet provided in the sides thereof, the unevenness of the resin flow per unit area around the circular die passage occurs when one of the extrusion conditions such as species of resin, resin temperature, the amount of resin flow or the like is altered, even though a construction concerning a manifold and the like is suitably determined where uniform and even resin flow around the circular die passage is obtainable under certain extrusion conditions.

Secondly, in the previous die assembly having nozzles equipped at the side thereof, the passages of resin should be so designed that the passages other than that for the inmost layer stride over the passages internally disposed and that the passages change the directions thereof gradually from radial directions to the direction which are parallel to the axis of the die. In the die of this type, since the diameter of the outer die passage becomes large with increase of the numbers of the layers, the portion of the die where the outer passage is curved from radial direction to the axial direction is proportionally increased both in radial and axial, i.e. parallel dimensions. As is apparent from the above descriptions, the dies of the ordinary ones are not only expensive to make and large in volume but also inconvenient to handle.

SUMMARY OF THE INVENTION

An object of the invention is to provide an extrusion multi-ring die for extruding tubes composed of a plurality of layers which is easy and inexpensive to make and also is convenient to handle.

Another object of the invention is to provide an extrusion multi-ring die in which even and uniform resin flow around the circular die passage is attainable.

Further object of the invention is to provide an extrusion multi-ring die which is available even in the apparatus which is adopted for formation of tubes of single layer.

Another object of the invention is to provide an extrusion multi-ring die in which the order of the arrangement of the layers and the species of the resin are easily alterable.

Other objects of the invention will become apparent from the following description and the accompanying drawings.

With respect to the first deficiency of the ordinary die assembly stated above, the unevenness of the resin flow is remarkably reducible in the die of the invention by virtue of the die provided with a column-like portion formed with a passage which once comes to the branch point disposed on center line of the column-like portion and diverges thereat, a plurality of branch bores which extends from the branch point to the inlets of die passage in the die portion being formed and the cross-sectional shapes of a group of branch bores branched radially at a certain branch point being preferably identical. As a result, in the die of the invention, it is easily possible to feed the resin through more than four inlets into the ring-shaped die passage and to equalize the amount of resin flow per unit area regardless of alteration in extrusion conditions. Because the thickness of the film extruded from the outlet in the die of the invention is uniformed in proportion to the increase of the numbers of the inlets, the die of the invention can bring a solution to the unevenness in thickness between the portion of film extruded near the inlet of resin and the opposed portion, which is often seen in the ordinary die having only one inlet extending laterally through which the resin is introduced. The unevenness particularly comes about with the alteration of extrusion conditions, in the ordinary dies.

With respect to the aforementioned second deficiency of the prior art in which the die has a tendency to grow larger in proportion to the increase of numbers of the layers, the die of the invention, differing from the ordinary die arrangement in which the circular passage for the outer layer surrounds concentrically the passages internally disposed, can be kept in compact size both longitudinally and radially owing to the following reasons.

Firstly, the flow passage comprising a plurality of individual bores can be disposed around the pitch circles of different radii or can be positioned on the planes which are arranged radially and equidistantly around the center line of the die and are disposed on parallel to the center line thereof, further permitting easy arrangement of bores without causing interference therebetween. Secondly, the bores of the invention can be bent in small radius without stagnation since the bores of relatively small diameter are available in the die of the invention.

The compactness in size and lightness in weight of the die not only make it ease to handle and inexpensive to manufacture, but also they make it possible to put the multi-ring die of the invention between the extruder diehead and the forming apparatus which are adopted for formation of the tube of a single layer, resulting in remarkable reduction of cost and procedure in case of the diversion from the apparatus of the tube of a single layer to the apparatus for the tube of multi-layer.

As stated above, the multi-ring die of the invention is available for formation of inflation tube and blow of bottle, only by providing with an auxiliary extruder and displacing the die portion which is adapted for single tubes to a suitable die portion.

DETAILED DESCRIPTION OF THE INVENTION

Embodiments of the invention will be described below in greater detail with reference to the accompanying drawings.

A die of the invention comprises a column-like portion C and a die portion D.

Figure 1:
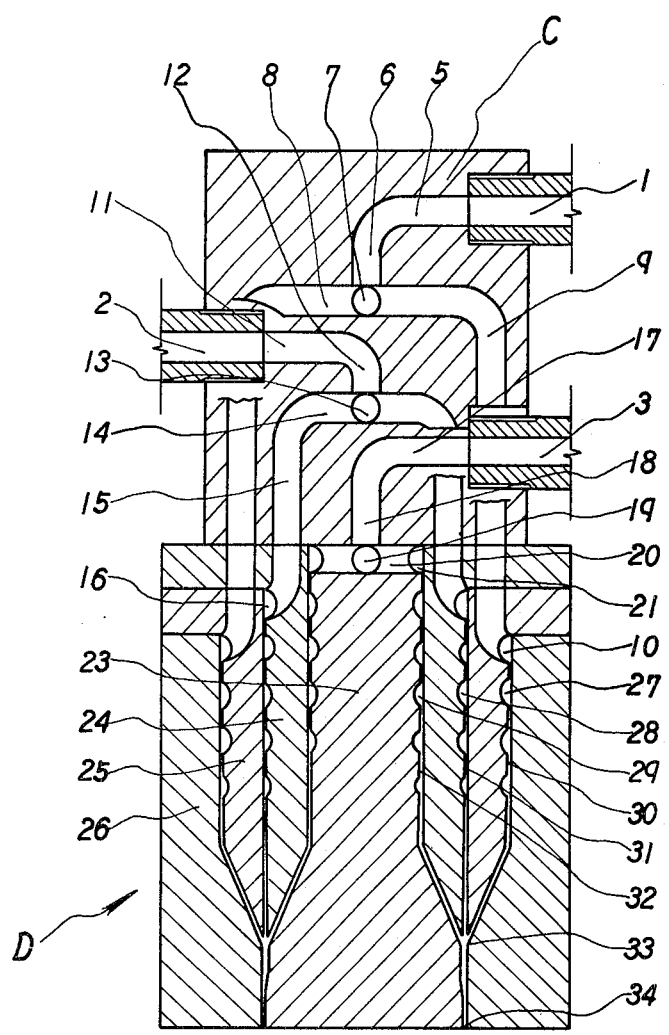
FIGS. 1 to 3 are views in vertical section showing the embodiments of the multi-ring dies of the invention.

In FIG. 1, a nozzle 1 through which a resin plasticized at an unillustrated first extruder is fed into the die portion D is mounted fixedly on a side of the column-like portion C (hereinafter referred to as column C). Indicated at 2, 3 are similar nozzles, from which the resins plasticized at a second and a third extruders (not shown) are fed into the die portion D. A cross-section of the column C may be either circular or polygonal. According to the first embodiment of the invention shown in FIG. 1, the nozzles 1, 2, 3 are illustrated as mounted on the side periphery of the column C and are extending in directions radially to the center thereof. However, this invention is not limited to this mode of nozzle mounting. For example, the nozzles 1 and/or 2 and/or 3 can be equipped on the top end of the column C.

In FIG. 1, a passage for flowing the resin supplied from the nozzle 1 into an inlet 10 of the die portion D comprises a guide passage extending from the nozzle 1 to a branch point 7 and a branch passage composed of a plurality of branch bores and extends from the branch point 7 to the inlet 10 of the die portion D.

The guide passage has a radial guide bore 5 communicating with the nozzle 1, an axial guide bore 6 formed longitudinally on a center line of the column C and terminating at the branch point 7 and a curved bore disposed therebetween. The branch bores comprise radial branch bores 8 extending radially and outwardly from the branch point 7 which is formed on the center line of the column C, axial branch bores 9 disposed in parallel to the longitudinal axis of the column C and communicating with the inlet 10 of the die portion D, and curved bores arranged therebetween.

Accordingly, the resin introduced from the nozzle 1 flows at first radially and inwardly in the direction to the center of the column C through the radial guide bore 5, changing the direction thereof gradually before it reaches the center of the column C, and flows into the axial guide bore 6 formed along the center axis of the column C. The resin which flows along the center axis of the column C arrives at the branch point 7, diverges thereat and flows into the branch bores. The resin which flows radially and outwardly through the radial branch bores 8, changing the directions thereof gradually and passing through the curved bores, is fed into the inlet 10 of the die portion D.

Although a preferable number of the branch bores is four or more, two or three branch bores can also be available therefor.

A resin supplyed from the nozzle 2 flows at first through a radial guide bore 11 and an axial guide bore 12 and reaches a branch point 13 in the similar manner as that of the resin of the nozzle 1. The resin diverges thereat, flowing through a plurality of radial branch bores 14 and axial branch bores 15, and reaches an inlet 16 of the die passage.

A resin from the nozzle 3 similarly flows through a radial guide bore 17 and an axial guide bore 18 into a branch point 19. The resin diverges thereat, flowing first through a plurality of radial branch bores 20, and reaches an inlet 21 of the die portion. The passage for the resin from the nozzle 3 is lacking in axial branch bores, differing from those for resins of the nozzles 2, 3.

In case of arrangement of the passages, the lengthwise positions of the respective branch point 7, 13 or 19 should be different from each other at a certain distance in order to preclude the radial brach bores from being interferenced therebetween. Besides the axial branch bores 9 or 15 branched at a certain branch point 7 or 13 are preferably positioned on planes arranged radially and equidistantly around the longitudinal center axis of the column C and containing it. Additionally, the axial branch bores 9, 15 may be arranged either on pitch circles of different diameters or on one pitch circle, the angular phases on which all the bores are disposed being different from each other. Of course, it is possible to arrange each group of branch bores branched at certain points on their own pitch circles, where the each angular phase on which a bore is disposed is different from that of other bores.

As obvious from the foregoing descriptions, since there are many combinations for arranging the passages without interferences therebetween, the column can be kept compact in size regardless of increase of the numbers of the layers of the tube.

Axial branch bores are not indispensable in the branch passage of the die of the invention, as shown in FIG. 1 with respect to the passage for the resin from the third nozzle 3.

The die portion D provided at the end of the column C comprises a core 23, a first die ring 24, a second die ring 25 and a third die ring 26.

The core 23, the first die ring 24 and the second die rig 25 are formed in their outer peripheral surfaces with helical grooves 27, 28, 29. Preferably, the outside diameters of the core 23, the first and second die rings 24, 25 progressively reduces toward the upper end of the die. Similarly the depth of the grooves progressively reduces.

Large amount of the resin introduced into the inlet 10 through the nozzle 1 flows through the spiral herical groove 27 formed around the second die ring 25, while the remaining part of the resin leakages through the tapered clearance defines between the second die ring 25 and the third die ring 26. Similarly, large amount of resin from the inlets 16, 21 flows through the helical grooves 28, 29, while the remaining parts of the resins flow through the respective tapered clearance 31, 32. The resins from the inlets 10, 16, 21 joint together at a junction 33 with forming a multi-layer of resin and thereafter is extruded from a die outlet 34.

Figure 2:
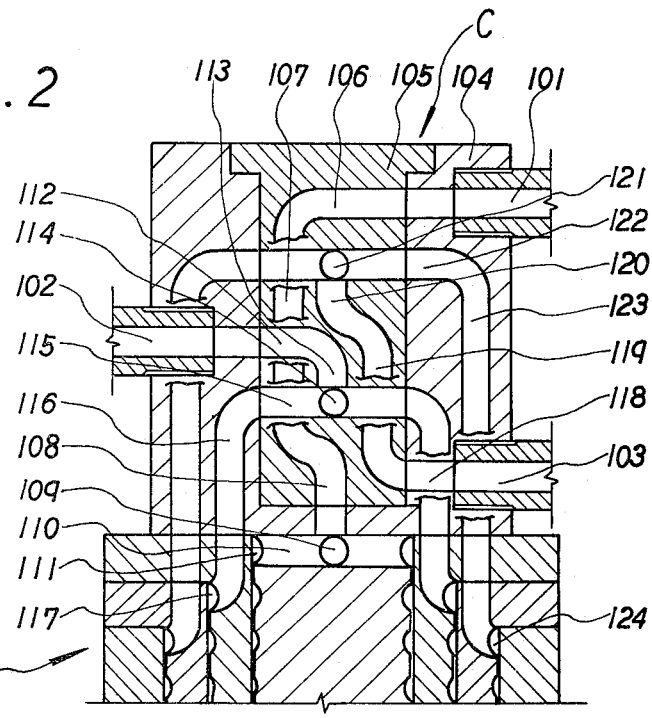

FIG. 2 shows another embodiment of the invention. A nozzle 101 through which a resin plasticized at an unillustrated first extruder is fed into the die portion D is mounted fixedly on a side of a column C which comprises an outer ring 104 formed with a center hole and an interchangeable change column 105 provided therein. Indicated at 102, 103 are the similar nozzles fixed on the column C for introducing resins from the respective extruders (not shown) into the die portion D. A cross-section of the column C may be either circular or polygonal. In the embodiment having such a change column 105 shown in FIG. 2, a resin supplyed through the nozzle 101 flows inside a radial guide bore 106 in the direction to the center of the column C, passing through the center of the column C and changing its direction gradually, and flows into the axial guide bore 107, from which the resin bends again and reaches at a branch point 109 through a second axial guide bore 108 which is disposed on the center line of the column C. The resin, thereafter, diverges at the branch point 109 and flows through a plurality of radial branch bores 110 into a first inlet 111 of the die portion D.

The resin introduced through the second nozzle 102 flows through a radial guide bore 112 and an axial guide bore 113 formed on the center line of the column C into a branch point 114, from which the resin branches thereat and flows through a plurality of radial branch bores 115 and axial branch bores 116 which are arranged in parallel to the axis of the column C into a second inlet 117.

The resin supplied from the third nozzle 103 flows through the radial guide bore 118 in the direction to the center of the column C, gradually changing its direction upwardly before it reaches the center of the column, and flows into an axial guide bore 119, from which the resin again changes its direction and reaches a branch point 121 through another axial guide bore 120 formed on the center line of the column C. Thereafter, the resin branched at the branch point 121 flows into the third inlet 124 of the die, passing inside of a plurality of radial branch bores 122 and axial branch bores 123.

The components constructing the die portion D are the same as those in the embodiment shown in FIG. 1. Although the nozzle arrangements are the same in two embodiments of FIGS. 1, 2, the resin in the embodiment shown in FIG. 1 supplyed from the first nozzle 1 flows into the outer inlet 10 and the resins introduced through the nozzles 2, 3 are guided into the intermediate inlet 16 or the inner inlet 21 respectively, whilst the resin in the embodiment of FIG. 2 supplying from the first nozzle 101 flows into the inner inlet 111 and the resins from the second and third nozzles 102, 103 passes into the intermediate or outer inlets 117, 124 respectively.

As obvious by those skilled in the art, the passage in the embodiment shown in FIG. 2 is easily alterable, leaving the die portion, the outer ring 105 and the extruders unreplaced by virtue of the interchangeable change column 105. For example, if the change column 105 is provided with the same passage as that of column C shown in FIG. 1, the resin flows in the conditions as already described with reference to FIG. 1.

Figure 3:
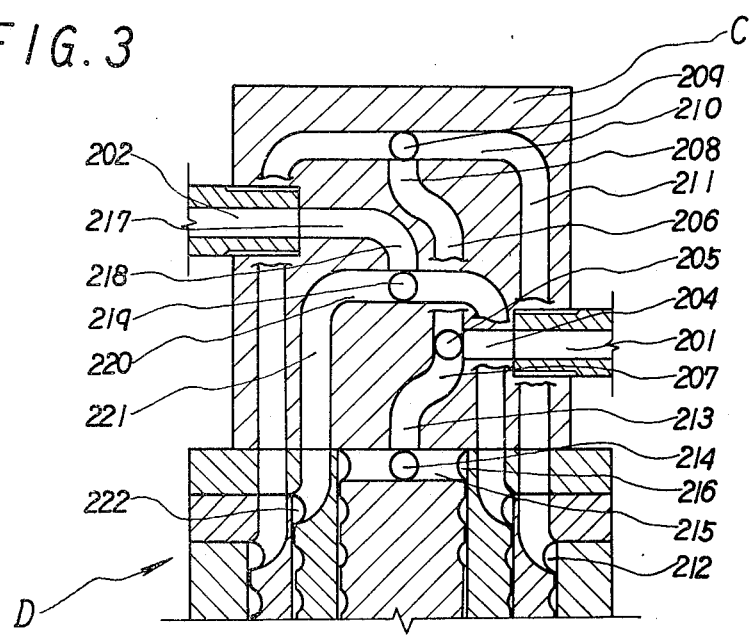

FIG. 3 shows another embodiment of the invention. A nozzle 201 through which a resin plasticized at an extruder (not shown) is fed into the die is mounted on a side of the column C, the cross-section of which may be circular or polygonal. Indicated at 202 is the similar nozzle for introducing a plasticized resin from a second extruder (not shown) into the die portion D.

The resin introduced through the nozzle 201 flows through a radial guide bore 204 in the direction to the center of the column C into the distribution point 205. The guide passage is divided into an axial guide bore 206 upwardly extending therefrom and an axial guide bore 207 downwardly extending therefrom which are preferably disposed in parallel to the center axis of the column C in the embodiment shown in FIG. 3. The resin shared into the axial guide bore 206 flows upwardly, thereafter bending gradually so that it comes to flow through another axial guide bore 208 which is formed on the center line of the column C, and flows into a branch point 209. The resin diverges thereat and flows through a plurality of radial branch bores 210 and axial branch bores 211 into the outer inlet 212 of the die portion D, for feeding the outer layer resin.

The resin guided into the axial guide bore 207 flows downwardly, thereafter bending gradually so that it flows inside another axial guide bore 213 which is formed on the center line of the column C, and flows into a branch point 214. The resin diverges thereat and flows through a plurality of radial branch bores 215 to an inner inlet 216 of the die portion D, for feeding the inner layer resin.

The resin supplied from the second nozzle 202 flows through a radial guide bore 217 and an axial guide bore 218 into a branch point 219. The resin diverges thereat and flows through radial branch bores 220 and axial branch bores 221 into a second or intermediate inlet 222.

According to the embodiment shown in FIG. 3, the resin supplyed from the first nozzle 201 is easily divided into two divisional flows, one of which being led into the outer inlet 212 of the die portion D and the other being led into the inner inlet 216 of the die portion D. The resin from the second nozzle is introduced into the second inlet 222 of the die for feeding the intermediate layer resin, in the same manner as those shown in FIGS. 1, 2.

In the foregoing embodiments, the die portion D is described that it has a plurality of die passages provided with the helical grooves 27, 28, 29 which are formed in the outer peripheral surfaces of the core 23 and the die rings 24, 25 and are extending immediately from the inlets thereof. However, the grooves are not limited to such helical grooves but they may be in the shape of circular grooves separated longitudinally at certain distances from each other. Further, the helical grooves can be formed in such a structure in which the widths of the grooves are relatively narrow at the neighborhood of the inlets and they progressively increase toward the end thereof, resulting in the formation of a circular groove at the ends thereof so as to decrease the dead region where the resin is confined, undergoing decomposition by being subjected to high temperature for a prolonged time period.

Moreover, it is within the scope of the invention to adopt the technical concepts known in the ordinary die assembly into the die of the invention. For example, the inner passage of the column of the invention can be fabricated in the shape of ordinary spider type, or the outer passage can be provided with a manifold which strides passages internally disposed.

As already stated, the species of resin of the first and second layers can be easily alterable and, if necessary, the resins of the inner and outer layers can be supplyed from a common extruder only by displacing the column, even if the die portion D is used as it is, resulting in the advantages of the invention in which it is easily possible to change the layer arrangement and the species of resin.

In case of adopting the interchangeable change column shown in FIG. 2, the order of the arrangement of the inner and outer layers can be easily reversed only by displacing the change column, remaining the main components of the apparatus such as the outer ring of the column, die portion and the extruder and the like in their original conditions and locations.

Further, the die of the invention is substantially free of any dead region where the resin is stagnating and is undergoing deposition regardless of increase in numbers of the layer, since the passages having an extremely large sectional areas usually seen in the ordinary die assembly in which the outer resin flow strides over the inner resin flow is not existing in the die of the invention.

As already stated, because the bores of the invention for feeding the resin are preferably circle in relatively small diameter and it is possible to separate each group of the radial branch bores branched at certain branch points from another groups thereof in lengthwise direction and to position the axial branch bores on circles of different diameters or on planes of different angular phases, permitting to use the volume of the column to the best advantage, the column equipped with the resin passages of the invention can be kept in small-size, even if the numbers of the layer are increased.

Moreover, since more than four inlets are available in the die of the invention, the unevenness in the amount of circular resin flow through the circular passage defined between the core and the rings, can be effectively reduced with the increase in numbers of die passage inlets, although the numbers of repeating are increased. Accordingly, in spite of the alterations in the extrusion conditions such as the species of resin, the temperature, and the extrusion amount per time, an even and uniform resin flow is attainable at all time.

Further, since the passage for feeding the resin in the invention can be machined with ease by drilling, it is easier and less expensive to make than those in ordinary dies having complex curves.

What we claim is:

1. A multi-ring die for extruding a tube composed of a plurality of layers said multi-ring die comprising a die portion having a core and at least two rings disposed one around another and defining die passages therebetween and a column-like portion having at least two nozzles mounted on the outer periphery thereof and formed with passages communicating with the nozzles for feeding a plurality of plasticized resins into the die passages; each passage in the column-like portion comprising a guide passage extending from the nozzle to a branch point which is formed on the center of the column and a branch passage extending from the branch point to an inlet of the die passage; the guide passage having a bore communicating with the nozzle; the branch passage having a plurality of branch bores each branch bore including a radial bore portion extending radially and outwardly from the branch point and an axial bore portion extending from the outer ends of the radial bore portion in a direction parallel to the longitudinal axis at the column-like portion wherein the bores are separated from each other; and wherein the cross-section of a group of the branch bores branched at a certain branch point are identical to each other.

2. The multi-ring die as defined in claim 1 wherein the radial portions of the branch bores are disposed on the planes arranged at equal circular pitch around the axis of the column and containing the axis thereof.

3. The multi-ring die as defined in claim 1 wherein the column comprises an outer ring formed with a resin flow passage communicating with the nozzle mounted at the outer periphery thereof and an interchangeable change column formed with another resin flow passages which communicates with the passage of the outer ring.

4. The die as defined in claim 1 wherein the guide passage has at least one guide bore which comprises a single radial guide bore extending from the nozzle to a distribution point and a plurality of axial guide bores extending from the distribution point to the branch points.

5. The die as defined in claim 1 wherein the column-like portion is circular in cross-section.

6. The die as defined in claim 1 wherein the column-like portion is polygonal in cross-section.

* * * * *